United States Patent [19]
Yata et al.

[11] 3,846,814
[45] Nov. 5, 1974

[54] ELECTRICAL EXPOSURE CONTROL DEVICE FOR PHOTOGRAPHIC CAMERAS

[75] Inventors: Koutaro Yata; Masayoshi Sahara, both of Osaka-fu, Japan

[73] Assignee: Minolta Camera Kabushiki Kaisha, Osaka-shi, Osaka-fu, Japan

[22] Filed: July 23, 1973

[21] Appl. No.: 381,393

Related U.S. Application Data
[63] Continuation of Ser. No. 230,294, Feb. 29, 1972, abandoned.

[30] Foreign Application Priority Data
Mar. 6, 1971  Japan.............................. 46-11593
Apr. 10, 1971  Japan.............................. 46-26599

[52] U.S. Cl. ............................ 354/226, 354/51
[51] Int. Cl. ............................................ G03b 7/08
[58] Field of Search ........... 95/10 CT, 53 E, 53 EA, 95/53 EB; 354/60, 50, 51, 226

[56] References Cited
UNITED STATES PATENTS
| | | | |
|---|---|---|---|
| 3,460,450 | 8/1969 | Ogihara | 354/51 |
| 3,460,451 | 8/1969 | Starp et al. | 354/51 |
| 3,659,509 | 5/1972 | Burgarella | 354/51 |
| 3,683,767 | 8/1972 | Sahara | 354/51 |

*Primary Examiner*—Samuel S. Matthews
*Assistant Examiner*—Michael L. Gellner
*Attorney, Agent, or Firm*—Watson, Cole, Grindle & Watson

[57] ABSTRACT

A universal circuit module is adaptable for the automatic exposure control of different types of camera shutter mechanisms. The circuit module includes switching means responsive to input signals for supplying output signals for controlling the excitation of a load connected to output terminals of the module and biasing means for biasing semiconductor switch means within the module for actuating the switch means at one-half of the voltage of a power source.

9 Claims, 12 Drawing Figures

AN ELECTRICAL EXPOSURE CONTROL DEVICE FOR PHOTOGRAPHIC CAMERAS

This is a Continuation, of application Ser. No. 230,294 filed Feb. 29, 1972, now abandoned.

BACKGROUND OF THE INVENTION

The present invention relates to an electrical expsoure control device for a photographic camera, more particularly to such a device which is composed of an integrated circuit using a semi-conductor constituting two switch circuits and useful for control of both a curtain shutter and a lens shutter, by connecting external terminals to a timing circuit, electrical means for setting exposure factors, indicating members, a load for controlling the exposure, and an electric power source. One of the switching circuits controls the shutter speed in accordance with the exposure conditions.

In the prior exposure control devices, the electrical control circuit has been assembled in accordance with a variety of cameras, therefore, it is difficult to be assembled and various electric elements constituting an electrical control circuit are varied for every kind of cameras and as the result of the cost thereof becomes expensive.

By selecting components in the circuit for controlling the shutter speed in common in various cameras and circuits for the indicating member and by forming those circuits into an integrated circuit, the present invention provides a control device capable of use for both a curtain shutter which exposure is controlled by two curtains and a lens shutter which exposure is controlled by the turning of a set of sector blades. Thereby, mass-production of the circuits and lower costs can be obtained. Also, an electric element for controlling the exposure varied in accordance with a variety of cameras is connected to external terminals thereof to enable the exposure to be controlled with a variety of cameras.

THE OBJECT OF THE INVENTION

One object of the present invention is to provide an electrical exposure control device which is applicable to various cameras and forms a common portion of the electrical control circuit for the shutter speed by an integrated circuit including two switching circuits.

Another object of the present invention is to provide an electrical exposure control device comprising an integrated circuit using a semiconductor and including two switching circuits applicable for controlling the shutter speed of a curtain shutter in which two curtains control the exposure and also for a lens shutter in which a set of rotatable sectors control the exposure.

Yet another object of the present invention is to provide an electrical exposure control device having an integrated semiconductor circuit including two switching circuits, and when it is applied for controlling the shutter speed of the curtain shutter one of the two switching circuits controls the time intervals for the start of both curtains in accordance with the diaphragm aperture of the camera lens, the film sensitivity used, and the brightness of an object, and the other of the two switching circuits adjusts the position discrepancy of the running start due to the overlap of both curtains for preventing leakage of light during the charging process and the cocked position of the shutter curtains.

Still another object of the present invention is to provide an electrical exposure control device having an integrated semiconductor circuit including two switching circuits, and when it is applied to a lens shutter one of the switching circuits controls the proper shutter speed in accordance with the diaphragm aperture of the camera lens, the film sensitivity used, and the brightness of an object, and at the same time indicates whether the shutter speed controlled is slow or not relative to the critical shutter speed for camera vibrator during exposure when the camera is hand-held. The other of the switching circuits indicates whether the shutter speed controlled as described above is quick or not relative to the highest shutter speed possible for the camera.

Still another object of the present invention is to provide an electrical exposure control device in which in an integrated semiconductor circuit including two switching circuits wherein the base of a transistor provided with an external output terminal of at least one of the switching circuits is provided with a plurality of input terminals connected respectively through different resistances, and in accordance with an external load connected to the external output terminal any one of the input terminals is selected.

SUMMARY OF THE INVENTION

In order to attain the above-mentioned objects, the present invention comprises an integrated semiconductor circuit including two switching circuits. There are provided two external feed terminals connected to an electric power source for each of the switching circuits, an external input terminal connected to a timing circuit and another external input terminal for the first switching circuit to set a trigger voltage of the first switching circuit, and external input terminals thereof. An external input terminal of the second switching circuit connects into the external output terminal to provide an input. When the integrated circuit is applied to a curtain shutter provided with a first and a second curtain there is a control signal for the proper shutter speed in accordance with the brightness of an object, the diaphragm aperture of the objective lens, the film sensitivity, which is detected by the external output terminal of the first switching circuit. In order to prevent leakage of light when the two shutters are cocked a delay signal of the control signal is input into the external input terminal of the second switch circuit in accordance with the overlap of both curtains. On the external output terminal of the second switching circuit there appears a proper shutter speed control signal in which an exposure control error due to the overlap of both curtains is corrected. When the integrated circuit is applied to a lens shutter the first switching circuit produces on the external output terminal thereof a shutter speed control signal in accordance with the output of the timing circuit, the diaphgram aperture of the objective lens, and the film sensitivity used, and indicates the slowness or the quickness between the critical shutter speed for camera vibration during exposure with a hand-held camera and the controlled shutter speed. The second switching circuit indicates the slowness or the quickness of the controlled shutter speed relative to the highest shutter speed possible for the camera.

BRIEF DESCRIPTION OF THE DRAWINGS

FIGS. 10A and B are an enlarged plan showing a restraining device for the second curtain in the curtain shutter, wherein FIG. 10A shows the case where the output exciting current can be small and FIG. 10B shows the case of where the output exciting current is required to be large.

DESCRIPTION OF THE PREFERRED EMBODIMENT

Figure 1:
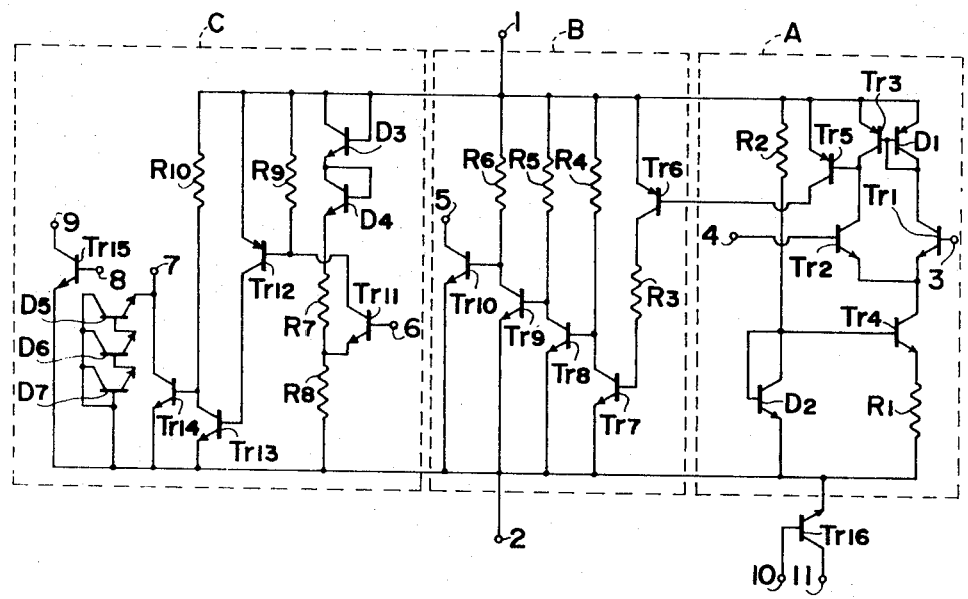
FIG. 1 is a diagram of one example of the integrated circuit in accordance with the present invention.
Figure 2:
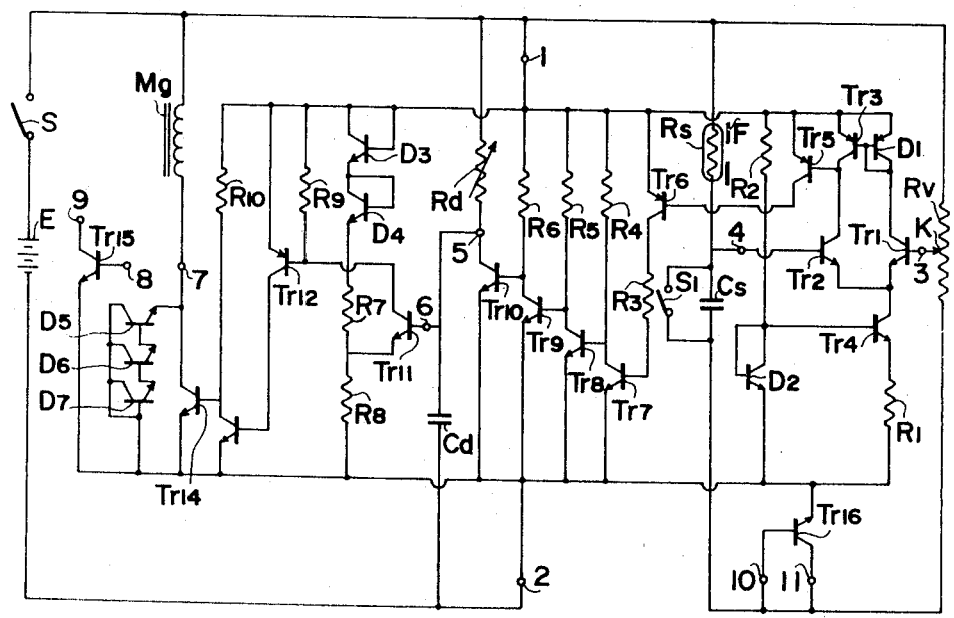
FIG. 2 is a circuit diagram in which the integrated circuit shown in FIG. 1 is applied to a curtain shutter.
Figure 3:
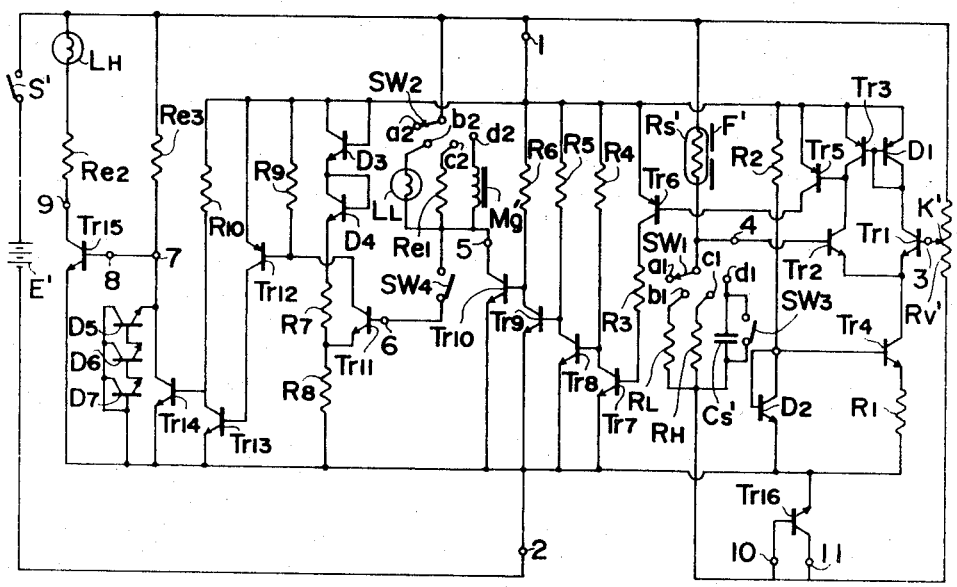
FIG. 3 is a circuit diagram in which the integrated circuit shown in FIG. 1 is applied to a lens shutter.

With reference to the embodiment shown in the accompanying drawings, the formation of the present invention will be described hereinafter. FIG. 1 shows an integrated circuit itself in accordance with the present invention, FIG. 2 shows an embodiment which is formed for a curtain shutter control by connecting external members such as a resistor, condenser, an electromagnet, and the like respectively to external connection terminals 1 to 12 shown in the circuit. FIG. 3 shows an embodiment which is formed for a lens shutter control in the same manner as described above.

In FIG. 1 showing the common circuit the integrated circuit is composed of three circuit portions A, B, and C. Circuit A includes a differential amplifier circuit using external connection terminals 3 and 4 respectively as an input terminal for the respective bases of two transistors $Tr_1$ and $Tr_2$, and has a circuit composed of transistor $Tr_4$, diode $D_2$, and resistors $R_1$ and $R_2$ to compensate for fluctuation of the power voltage, so as to function to hold the sum of emitter currents of transistors $Tr_1$ and $Tr_2$ in the differential amplifier circuit constant.

When the base potential of transistor $Tr_2$ connected to external connection terminal 4 attains the base potential of transistor $Tr_1$ connected to external connection terminal 3 of the collector current of transistor $Tr_2$ suddenly increases.

Just before transistor $Tr_2$ is conductive, transistor $Tr_1$ is made conductive and the collector current thereof is the sum of the current flowing through diode $D_1$ and the emitter-base current of transistor $Tr_3$. The collector current of transistor $Tr_3$ is made conductive by virtue of the impression of the voltage across diode $D_1$ but it is not flowing because transistor $Tr_2$ is cut-off. Under this condition, when the base potential of transistor $Tr_2$ attains the base potential of transistor $Tr_1$, a current becomes possible to flow between the collector and the emitter of transistor $Tr_2$ and the collector current of transistor $Tr_2$ flows between the emitter and the collector of transistor $Tr_3$. As a result, the voltage between the collector and the emitter of transistor $Tr_2$ drops and the base potential of transistor $Tr_5$ connected in common to the collectors of transistors $Tr_2$ and $Tr_3$ drops. And, with the increase of the collector current of transistor $Tr_2$ the collector current of transistor $Tr_1$ decreases and simultaneously the voltage across diode $D_1$ decreases and the voltage between the emitter and the base of transistor $Tr_3$ decreases as well. Thereby, the collector current of transistor $Tr_3$ decreases, however, in close interrelation with this fact the current flowing to the collector of transistor $Tr_2$ through the emitter and base of transistor $Tr_5$ increases and the conductive condition of transistor $Tr_2$ is suddenly realized. And thus, transistor $Tr_5$ is made conductive. The general function of circuit A makes transistor $Tr_5$ conductive when the electric potential of terminal 4 attains the electric potential of terminal 3 and feeds the output thereof to the base of transistor $Tr_6$ in circuit B described later.

Next, the detailed formation of circuit B shown in FIG. 1 and the function thereof will be explained. When transistor $Tr_6$ becomes nonconductive the base current is not fed to the base of transistor $Tr_7$ and accordingly transistor $Tr_7$ becomes nonconductive. Transistor $Tr_8$ to the base of which the collector of transistor $Tr_7$ is connected, transistor $Tr_9$ to the base of which the collector of transistor $Tr_8$ is connected, and transistor $Tr_{10}$ to the base of which the collector of transistor $Tr_9$ is connected are connected in order, and the collectors of transistors $Tr_7$, $Tr_8$ and $Tr_9$ are connected to external terminal 1 respectively through resistors $R_4$, $R_5$ and $R_6$. And, the collector of transistor $Tr_{10}$ is connected to external terminal 5. All the emitters of transistors $Tr_7$ to $Tr_{10}$ are connected to external terminal 2. And thus, in order to obtain a current to a load connected to external terminal 5 these transistors form an amplifier circuit, and when transistor $Tr_7$ is nonconductive transistor $Tr_8$ is made conductive by the rise of its base potential and transistor $Tr_9$ becomes nonconductive by the drop of its base potential, and the base potential of transistor $Tr_{10}$ rises. Therefore, if a resistor is connected between external terminals 5 and 1 transistor $Tr_{10}$ is made conductive. Accordingly, when transistor $Tr_7$ is conductive transistor $Tr_{10}$ becomes nonconductive.

With the above explanation, circuit B is adapted to coact with circuit A so that when transistor $Tr_2$ is conductive transistor $Tr_{10}$ is nonconductive and when transistor $Tr_2$ is nonconductive transistor $Tr_{10}$ is conductive, and one switching circuit is formed by circuits A and B.

Next, the formation and function of circuit C will be explained. The base of transistor $Tr_{11}$ is connected to external terminal 6 and when the predetermined input is impressed onto the base of transistor $Tr_{11}$ it is conductive. The collector of transistor $Tr_{11}$ is connected to resistor $R_9$ and the base of transistor $Tr_{12}$. Therefore, when transistor $Tr_{11}$ is conductive an electric potential is produced between it and resistor $R_9$ and transistor $Tr_{12}$ is triggered to be conductive. Transistor $Tr_{13}$, to the base of which the collector of transistor $Tr_{12}$ is connected, is conductive by the conduction of transistor $Tr_{12}$. The collector of transistor $Tr_{13}$ is connected to external terminal 1 through the base of transistor $Tr_{14}$ and resistor $R_{10}$, and the collector of transistor $Tr_{14}$ is connected to external terminal 7, therefore, when a load is connected between external terminals 1 and 7 transistor $Tr_{14}$ becomes nonconductive by virtue of the conduction of transistor $Tr_{13}$.

Diodes $D_5$, $D_6$, and $D_7$ are connected in parallel with transistor $Tr_{14}$ and when a coil is connected between terminals 1 and 7 as a load, the counter electromotive force induced in the coil is absorbed to protect transistor $Tr_{14}$. Transistor $Tr_{15}$ forms the function between transistors $Tr_{14}$ and $Tr_{13}$ relative to transistor $Tr_{14}$ such that when transistor $Tr_{14}$ is conductive transistor $Tr_{15}$ becomes unconductive.

Figure 4:
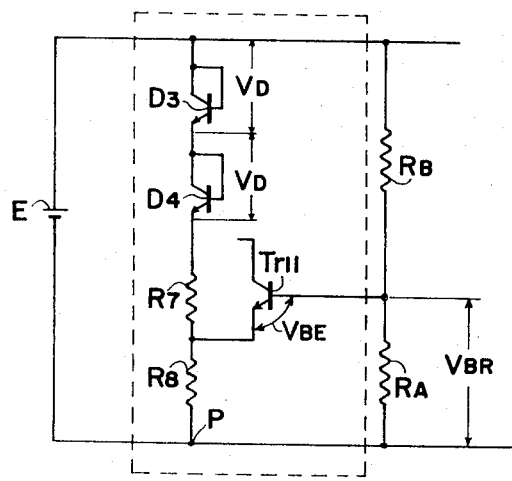
FIG. 4 is a partially enlarged view of circuit C in the integrated circuit shown in FIG. 1.

A circuit composed of diodes $D_3$ and $D_4$, and resistors $R_7$ and $R_8$ is for compensating the action of transistor $Tr_{11}$ for fluctuation of the power voltage, which will be explained in detail with reference to FIG. 4 hereinafter. In FIG. 4, a portion encircled by the broken line is the aforesaid circuit, wherein $R_A$ and $R_B$ denote resistors and E denotes an electric power source (in the coming explanation, denotations given to a resistor, an electric power source, and a condenser respectively show respective resistance, voltage, capacity thereof).

Provided $V_{BE}$ is a trigger voltage of transistor $Tr_{11}$ and $V_D$ is a voltge across diodes $D_3$ and $D_4$, the potential difference between one end P of resistor $R_8$ and the base of conductive transistor $Tr_{11}$ is as follows:

$$V_{BR} = ( E - 2V_D ) R_8/(R_7 + R_8) + V_{BE} \quad (1)$$

However, it is understood that formula (1) is set up when the emitter current of transistor $Tr_{11}$ is set to be sufficiently smaller than the current flowing through resistor $R_7$.

At the same time, when the resistance values of resistors $R_A$ and $R_B$ are set in order that voltage $V_{BR}$ is also produced across resistor $R_A$, $$( E - 2V_D ) (R_8)/(R_7 + R_8) + V_{BE} = E (R_A)/R_A + R_B) \quad (2)$$

is set up, and in formula (2) when each of them is set in order that $V_D = V_{BE}$ and $R_7 = R_8$ are set up said formula (2) turns to $$\tfrac{1}{2} = (R_A)/(R_A + R_B) \quad (3)$$

and said formula (2) is transformed into a formula having no relation to E, $V_D$, and $V_{BE}$.

And, voltage $V_D$ across each of diodes $D_3$ and $D_4$ and voltage $V_{BE}$ between the base and the emitter of transistor $Tr_{11}$ are respectively dependent upon the temperature, however, when the temperature coefficients thereof are equally taken formula (3) is still valid.

Therefore, even though the temperature and the power voltage are varied, transistor $Tr_{11}$ is made conductive when voltage $V_{BR}$ gets to one half of the power voltage. Circuit C forms separately one switching circuit.

FIG. 2 shows one embodiment in which the present invention is applied to a camera provided with a curtain shutter as described hereinbefore.

In general, the operation of a two curtain shutter is well known, wherein upon depressing the shutter button the first curtain runs and the film is exposed to incident light from the objective lens, and after a predetermined time elapses the second curtain runs and the film is shut off from exposure. The time when the second curtain starts to run is insufficient if it starts after the proper exposure time, determined by the film sensitivity, the brightness of an object, and the diaphragm aperture of the objective lens, elapses from the time when the first curtain starts to run. The second curtain must start to run after the proper exposure time plus a certain time unique to the with two curtains (in the practical design, approximately 4/1,000 to 5/1,000 seconds) elapses. This fact orginates from the curtain overlap for preventing a leakage of light between both curtains of the shutter during the shutter cocking process and while the curtains are restrained in the cocked position as the starting positions of the curtains are different. This time to be compensated is called an additional delay time hereinafter. This additional delay time is, as described above, approximately 4 to 5 milliseconds of four to five times as long as 1/1,000 second which is the highest shutter speed, and unless the additional delay time is adjusted, the precision of a shutter speed as 1/1,000 second can not be assured.

In the present invention, by making use of the integrated circuit shown in FIG. 1 for a curtain shutter control as shown in FIG. 2, the exposure control in the curtain shutter camera and the shutter speed control can be easily controlled with good precision.

In FIG. 2, $R_s$ denotes a photoconductive element, $C_s$ is a capacitor connected in series to photoconductive element $R_s$ to form the first timing circuit, and $S_1$ is a count switch for forming a short-circuit circuit for condenser capacitor $C_s$. The node between photoconductive element $R_s$ and capacitor $C_s$ is connected to external terminal 4. With resistance $R_v$ connected to power source E and power switch S in parallel with the first timing circuit, sliding terminal K is in contact, to slide thereon, so as to form a variable resistance for giving a bias voltage to transistor $Tr_1$. The resistance value thereof is set in accordance with the film sensitivity which is one of the photographing conditions.

The diaphragm or filter F in front of photoconductive element $R_s$ controls the object light incident upon photoconductive element $R_s$ in accordance with another of the photographing conditions such as the diaphragm value of the objective lens.

Transistor $Tr_{10}$ is connected in series to the timing circuit relative to external terminal 1 to which the negative side of power source E is connected raises the base voltage of transistors $Tr_1$ and $Tr_2$ to increase the number of adjustable steps in accordance with the film sensitivity effected by variable resistance $R_v$.

$R_d$ is a variable resistance and forms a second timing circuit together with capacitor $C_d$, and in order to start to charge capacitor $C_d$ through variable resistance $R_d$ when transistor $Tr_{10}$ is shut off, the node between variable resistance $R_d$ and capacitor $C_d$ is connected to external terminal 5 of circuit B and external terminal 6 of circuit C, so as to provide an input to circuit C.

$M_g$ is an electromagnet which is excited when transistor $Tr_{14}$ is conductive, to hold the restraining member of the shutter closing curtain, and releases that restraining when the exciting current is shut off, to actuate the closing operation of the closing curtain, is connected to external terminal 7 as an output load of circuit C.

In the embodiment formed as described above and shown in FIG. 2, when the shutter opening operation is started and concurrently power switch S is closed, capacitor $C_s$ in the first timing circuit is short-circuited by count switch $S_1$, thereby, the collector current of transistor $Tr_2$ is remarkably decreased, and transistor $Tr_3$ is nonconductive. And, as seen in FIG. 1 transistor $Tr_{10}$ is conductive and capacitor $C_d$ in the second timing circuit is short-circuited and scarcely charged, and transistor $Tr_{11}$ is nonconductive, therefore, electromagnet $M_g$ is excited to hold the shutter closing curtain at the restraining position.

Count switch $S_1$ is opened simultaneously with the opening operation of the shutter opening cutain and capacitor $C_s$ in the first timing circuit is charged through photoconductive element $R_s$. And, after the time corresponding to the proper exposure time for the brightness of an object in which the photographing conditions such as film sensitivity and the diaphragm value of the objective lens are provided through variable resistance $R_v$ and the filter or diaphgram F elapses, condenser $C_s$ is charged to the predetermined level and thereupon transistor $Tr_{12}$ is reversed to be conductive. As seen in FIG. 1 transistor $Tr_{10}$ becomes nonconductive and capacitor $C_d$ in the second time circuit is started to be charged through variable resistance $R_d$. And when the charging voltage thereof gets to the predetermined level described later transistor $Tr_{11}$ is conductive, therefore, transistor $Tr_{14}$ becomes nonconductive and electromagnet $M_g$ is shut off. Accordingly, the closing curtain is started to actuate the closing operation of the shutter.

The second timing circuit provides an additional delay time and when the resistance value of resistance $R_d$ and the capacity of capacitor $C_d$ are set, as described above, the charging time lasts as long as it takes the charging voltage of capacitor $C_d$ to reach one half of the power voltage which switches transistor $Tr_{11}$. Thus, additional delay time $t_d$ is unrelated to the power voltage. And thus, by making resistance $R_d$ variable or semi-fixed it is possible to easily control additional delay time $t_d$ with high precision in accordance with the running characteristics of the shutter curtain of each individual camera.

Further, in FIG. 3 the embodiment shown in FIG. 1 as applied to a lens shutter control will be described hereinafter. In the case where the preset diaphragm opening for the objective lens and the brightness of an object is so low as to require an exposure time over the critical shutter speed (for example, one-thirtieth second) which results in camera vibration during exposure of a hand-held camera for the proper exposure, by providing an alarm the diaphragm of the objective lens is opened wider. Or when the diaphragm is fully opened there is an indication that the camera should be fixed to a tripod. Furthermore, even though the preset diaphragm opening and the shutter speed are set for the shortest time for the function of camera, still when the brightness of an object is too high to obtain the proper exposure there is provided an alarm indicating the need to reset the exposure for proper exposure control.

In FIG. 3, the positive terminal of power source E' is connected to external terminal 1 and one end of variable resistance $R_v'$ through power switch S', and the negative terminal thereof is connected to external terminal 2 and the other end of variable resistance $R_v'$. Sliding contact K, which slides on variable resistance $R_v'$ and interlocks with the diaphragm mechanism of the camera is connected to external terminal 3. One end of the photoconductive element $R_s'$ is connected to terminal 1 and the other end thereof is connected to change-over switch $SW_1$ and external terminal 4. Change-over switch $Sw_1$ is provided with four change-over contacts $a_1$, $b_1$, $c_1$, and $d_1$, and contact $a_1$ is set free from the circuit, contact $b_1$ is connected to level detecting resistance $R_L$, contact $c_1$ is connected to level detecting resistance $R_H$, and contact $d_1$ is connected to capacitor $C_s'$ having count switch $Sw_3$. Between external terminals 1 and 5 there is connected change-over switch $Sw_2$ for switching to change-over contacts $a_2$, $b_2$, $c_2$, and $d_2$ in interlocking relationship with change-over switch $Sw_1$. Contact $a_2$ is set free, contact $b_2$ is connected to alarm lamp LL to indicate camera vibration for a hand-held camera, contact $c_2$ is connected to load resistance $Re_1$ and contact $d_2$ is connected to electromagnet $M_g'$ for holding the restraining member against the shutter closing operation. These contacts are all connected to external terminal 5 and external terminal 6 through switch $Sw_4$ which is closed only when change-over switch $Sw_2$ is connected to contact $C_2$. In addition, between external terminals 1 and 9 exposure over alarm lamp $L_H$ and correction resistance $Re_2$ are connected in series and the line between external terminals 7 and 8 is short-circuited.

Now with the formation as described above, assuming that the diaphragm opening of the lens was set, for example, to F8 beforehand with a certain brightness of an object, then in the first process of the shutter release operation power switch S' is closed and change-over switches $Sw_1$ and $Sw_2$ change over respectively from contacts $a_1$, $a_2$ to contacts $b_1$, $b_2$. And the object light impinges onto photoconductive element $R_s'$ through the filter or diaphragm F' for controlling the quantity of light incident upon photoconductive element $R_s'$ in accordance with the film sensitivity, and resistance value $R_s'$ is determined. By making use of a photoconductive element having such a property that when the quantity of incident light increases resistance value $R_s'$ decreases, it is possible to increase the base potential of transistor $Tr_2$ in accordance with an increase of the quantity of light according to the relation between that resistance and level detecting resistance $R_L$.

Thereupon, in the case where the shutter time in which the quantity of incident light is controlled, for example, for at F8 more than one-thirtieth second is required, the base potential of transistor $Tr_2$ is designed not to get to the base potential of transistor $Tr_1$ determined in interlocking with the diaphragm opening of the objective lens, and transistor $Tr_2$ is not conductive. Accordingly, transistor $Tr_{10}$ is conductive and lamp LL is lit for indicating that the exposure time controlled is beyond the critical limit of camera vibration for a hand-held camera. In this case, by opening wider the diaphragm of the objective lens and sliding contact K' so as to change to, for example, F5.6, the base potential of transistor $Tr_1$ is lowered below the base potential of transistor $Tr_2$, and when lamp LL is put out it is possible to see that the exposure time in accordance with the brightness of an object is controlled for a higher speed than the critical shutter speed of one-thirtieth second.

The alarm action in the case where the brightness of an object is too high for the function of the camera is checked when the shutter release operation is further completed and change-over switches $Sw_1$ and $Sw_2$ are respectively located on contacts $c_1$ and $c_2$. That is, with a preset diaphragm of F8, when the brightness of an object is higher than the highest exposure speed of the camera, for example 1/500 second, transistor $Tr_2$ is conductive, accordingly transistor $Tr_{10}$ becomes nonconductive. The increased collector potential of transistor $Tr_{10}$ is impressed on the base of transistor $Tr_{11}$ through closed switch $Sw_4$, and transistor $Tr_{11}$ is conductive, accordingly transistor $Tr_{14}$ becomes nonconductive, and transistor $Tr_{15}$ is conductive to light the over-exposure alarm lamp $L_H$.

Thereupon, the need of reducing the aperture of the lens is indicated, and for example when F8 is reduced to F11 or F16 the position of sliding contact $K'$ is changed, and by raising the base potential of transistor $Tr_1$ higher than that of transistor $Tr_2$ transistors $Tr_2$ and $Tr_{15}$ are reversed and over-exposure alarm lamp $L_H$ is put out and accordingly the exposure can be prevented.

Further, as the shutter release operation is completed, change-over switches $Sw_1$ and $Sw_2$ come into contact respectively with contacts $d_1$ and $d_2$, count switch $Sw_3$ is opened simultaneously with the starting of the shutter opening operation, and the charging of capacitor $C_s'$ is started. When it gets to the predetermined level the base potential of transistor $Tr_2$ becomes higher than that of transistor $Tr_1$. And when transistor $Tr_2$ is conductive transistor $Tr_{10}$ is reversed to become nonconductive and the exciting current to electromagnet $M_g'$ is shut off, so that the shutter closing operation is actuated and the exposure is controlled.

Figure 5:
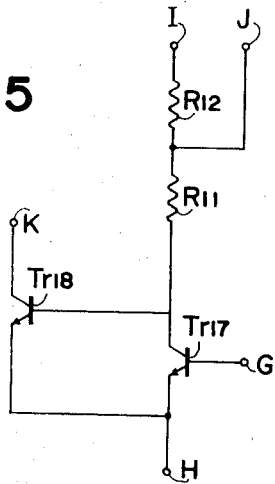
FIG. 5 is a fundamental circuit diagram of the second embodiment of the switching circuit of the integrated circuit shown in FIG. 1.

FIG. 5 shows the fundamental formation of an embodiment in which, to a transistor for producing an output to a final load of any one of two switching circuits in accordance with the present invention, for example, transistor $Tr_{14}$ in the circuit shown in FIG. 2 or transistor $Tr_{10}$ in the circuit shown in FIG. 3, two terminals are provided in order to change the feed quantity provided to the base of that transistor in accordance with the load, and any one of the feed terminals is connected to the electric power source. And, in order to simplify the drawing to facilitate the understanding thereof, only one switching circuit is shown in FIG. 5. Wherein, transistor $Tr_{17}$ into which an output of the timing circuit is input, to the base thereof input terminal G is connected, to the emitter thereof terminal H connected to one electrode of the power source is connected, and to the collector thereof terminal I is connected to the other electrode of the power source through resistors $R_{11}$ and $R_{12}$, and terminal J for short-circuiting resistor $R_{12}$ from the node between resistors $R_{10}$ and $R_{12}$ are connected. And, that collector is connected to the base of transistor $Tr_{18}$. The collector of transistor $Tr_{18}$ is connected to external output terminal K, and the emitter is connected to feed external terminal H.

Figure 6:
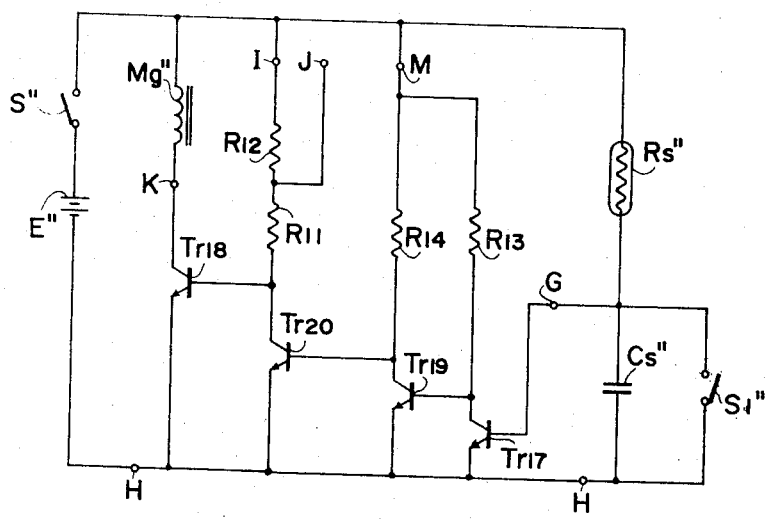
FIG. 6 is a diagram in which the switching circuit is used for the curtain shutter.

FIG. 6 is a diagram for the case where by means of an embodiment of an integrated circuit in which a switching circuit based on fundamental circuit is applied the exposure of the curtain shutter is electrically controlled. In this case, the circuit shown in FIG. 6 uses the switching circuit shown in FIG. 1, wherein input terminal G is connected directly to a timing circuit having photoconductive element $R_s''$, capacitor $C_s''$, and timing switch $S_1''$ in order to simplify the explanation. However, as shown in FIG. 1 this is connected to input terminal 4 of circuit A, and a circuit composed of resistor $r_d$ controlled by an output of output terminal 5 of circuit B and capacitor $C_d$ is connected to input terminal G of the circuit of that embodiment.

Figure 9:
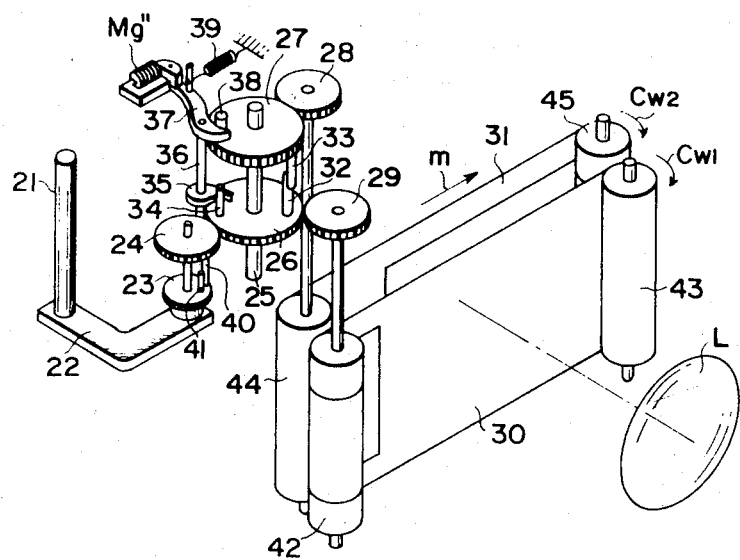
FIG. 9 is a perspective view showing one example of the curtain shutter controlled by the circuit shown in FIG. 6.

The curtain shutter corresponding to that circuit is composed, as shown in FIG. 9, of opening curtain 10 disposed just in front of the image forming plane of objective lens 1 and closing curtain 11, and opening curtain 10 is wound by winding shaft 22 and take-up shaft 22 biased in the direction shown by arrow $CW_1$. Closing curtain 11 is wound by winding shaft 24 and take-up shaft 25 biased in the direction shown by arrow $CW_2$.

On arm 22 fixed to shutter button 21 movable up and down for opening/closing power switch $S''$ [not shown in the drawing], shutter winding gear 23, meshed with a film winding gear, [not shown in the drawing] is supported by a pin, and gear 24 interlocked with winding gear 23 through pins 41 and 40 is loosely fitted on shaft 25 and always meshed with opening curtain winding gear 26.

Opening curtain winding gear 26 is rotatably supported on shaft 25 and has working pin 34 and connection pin 32 mounted thereon, and meshes with opening curtain gear 29 fixed to opening curtain winding shaft 42. With any one of gear trains 24, 26, and 29 opening curtain restraining lever [not shown in the drawing] engages, to hold it in the cocked condition and effect its restraining release in interlocking with the shutter release operation as well known in the prior art. Additionally, count switch $S_1''$ [not shown in the drawing] is closed in interlocking with the restraining release operation.

Closing curtain winding gear 27, having connection pin 33 projected downward for engaging with connection pin 32 to opening curtain winding gear 26 and restraining pin 38 projected upward, is loosely fitted rotatably on shaft 25 and meshed with closing curtain gear 28 integral with closing curtain winding shaft 44.

Closing curtain restraining lever 37 fixed to shaft 36 has a clockwise turning tendency through spring 39, and one arm of an iron armature faces electromagnet $M_g''$ and the other arm engages with restraining pin 38 to engage with closing curtain winding gear 27. To shaft 36 also engaging cam 35 is fixed and engages with working pin 34 to be pressed to move counterclockwise when the shutter winding is finished. Consequently, the lever of closing curtain restraining lever 37 is preset to contact with electromagnet $M_g''$ against the force of spring 39.

Figure 10A:
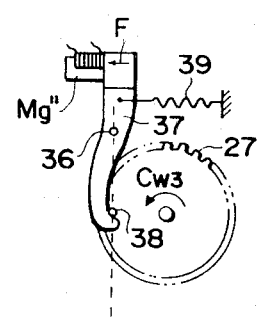

With reference to FIGS. 10(A) and (B), the state of restrained closing curtain at the time when the shutter cocking is finshed will be further explained in detail hereinafter. In FIG. 10(A), by virtue of the turning tendency of closing curtain take-up shaft 45 in the direction shown by arrow $CW_2$ (see FIG. 9), closing curtain winding gear 27 has the tendency to turn in the direction shown by arrow $CW_3$. However, closing curtain restraining lever 37 restrains winding gear 27 by the attraction force F of electromagnet $M_g''$. As shown in FIG. 10(A), therefore, in the case where the direction of force given to lever 37 by restraining pin 38 crosses at right angles to the direction of attraction force F, the turning return force effected by closing curtain winding gear 27 has no effect on attraction force F at all, and only the force of spring 39 acts against attraction force F. The attraction force of electromagnet $M_a''$, therefore, can be very small and the output thereof can be weak.

Figure 10B:
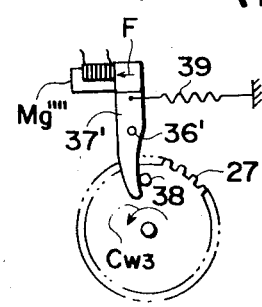

While, on account of a space or by other reason, as shown in FIG. 10(B) when the turning return force effected attraction force F, attraction force by closing curtain winding gear 27 is added to attraction force oppose the turning return force and the accumulated energy of spring 39, and the output of electromagnet $M_a'''$ is required to be large.

Figure 7:
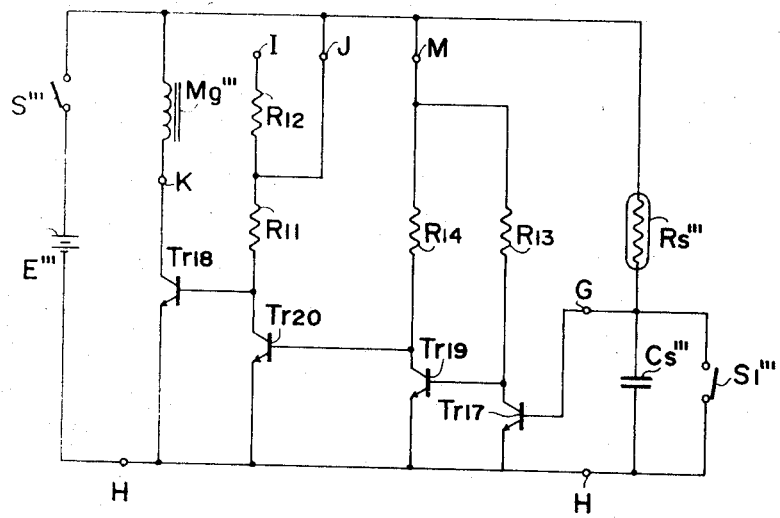
FIG. 7 is a diagram in which the switching circuit is used for the lens shutter.

That is, in the case of a curtain shutter, when designed as shown in FIG. 10(A) feed terminal I of the external terminal of the integrated circuit device is put to use as shown in FIG. 6, and when designed as shown in FIG. 10(B) feed terminal J of the integrated device as shown in FIG. 7 is put to use.

Next, the operation of a curtain shutter control formed as described above will be explained. In interlocking relationship with the film winding, shutter winding gear 23 is turned counterclockwise to turn gear 24 counterclockwise through pins 41 and 40 and opening curtain winding gear 26 is turned clockwise to turn opening curtain gear 29 counterclockwise and wind opening curtain 30 around winding shaft 42 against the driving force to turn opening curtain take-up shaft 43 in the direction shown by arrow $CW_1$. Simultaneously therewith, on account of the engagement of connection pins 32 and 33 closing curtain winding gear 27 also is turned clockwise to wind closing curtain 31 against the driving force to turn closing curtain take-up shaft 25 in the direction shown by arrow $CW_2$. When that winding is finished restraining pin 38 engages with closing curtain restraining lever 37. And simultaneously, engaging cam 35 engages with working pin 34 to be pressed to move counterclockwise and press the armature of closing curtain restraining lever 37 onto electromagnet $M_a''$ against spring 39, and is restrained at that position by an opening curtain restraining lever [not shown in the drawing] and the cocking is finished.

In this state, upon depressing shutter button 21, first of all power switch S'' is closed by button 21, so that an exciting current flows to electromagnet $M''_a$ and closing curtain restraining lever 37 restrains closing curtain winding gear 27. When feed terminal I is connected to power source E'' a weak exciting current is produced and when feed terminal J is connected to power source E'' a strong exciting current is produced.

Upon further depressing shutter button 21, shutter winding gear 23 is disengaged from gear 24 and simultaneously opening curtain restraining lever [not shown in the drawing] is released from its restraint. The gears in the opening curtain system start to rotate, the running of opening curtain 30 in the direction shown by arrow m is started, timing switch S'' is opened, the charging of capacitor $C_s''$ in the delay circuit is started in accordance with the brightness of an object, and when that charging gets to the predetermined voltage, all of transistors $Tr_{17}$, $Tr_{19}$, $Tr_{20}$, and $Tr_{18}$ are reversed to cut off the exciting current to electromagnet $M_a''$. Closing curtain restraining lever 27 is turned clockwise by spring 39 to release the restraint of restraining pin 38, so that the gears in the closing curtain system start to run and closing curtain 31 also runs in the direction shown by arrow m and the proper exposure is finished. Therefore, when the curtain shutter is formed as shown in FIG. 10(B) it is necessary to be connected as shown in FIG. 7.

Figure 11:
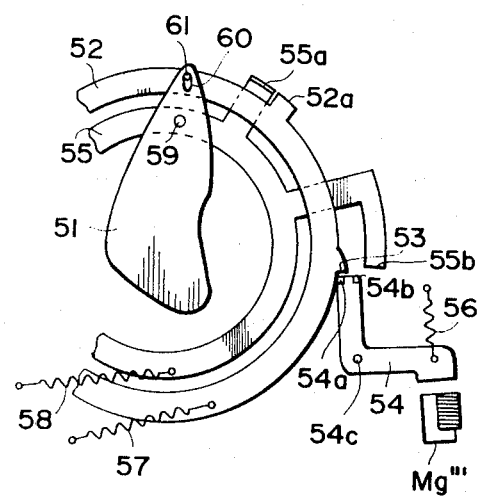
FIG. 11 is a front view showing the essential portion of one example of the lens shutter controlled by the circuit shown in FIG. 7.

Next, the case where an integrated circuit device in accordance with the present invention is put to use in a lens shutter will be described. In this case, the circuit shown in FIG. 7 corresponds to circuit B in the circuit shown in FIG. 1, and as a matter of course circuits A an C are added thereto. The lens shutter is formed as shown in FIG. 11. That is, driving ring 52 for opening the shutter and driving ring 55 for closing the shutter are supported concentrically about the optical axis, and shutter blade 51 [only one of which is shown in the drawing] is supported rotatably on driving ring 55 for closing the shutter by pin 59, and in long slot 60 thereof there is fitted pin 61 mounted on driving ring 32 for opening the shutter.

In FIG. 11, therefore, by rotating driving ring 52 for opening the shutter clockwise shutter blade 51 is turned clockwise using pin 59 as a pivot. And, by rotating driving ring 55 for closing the shutter clockwise shutter blade 51 is turned again counterclockwise to close the blades.

Between both driving rings 52 and 55, shutter plate springs 57 and 58 are respectively provided and biased in a clockwise direction. Connection projection 52a of driving ring 52 for opening the shutter and projection 55a of driving ring 55 for closing the shutter are adapted to engage with each other, and on driving ring 52 for opening the shutter restraining step 53 is projectingly provided and on driving ring 55 for closing the shutter restraining projection piece 55b is provided.

Restraining lever 54 is formed into an L-letter shape and supported by pin 54c and biased in a counterclockwise direction by spring 56. And one arm of lever 54 has an armature facing electromagnet $M_a'''$ and formed so as to be attracted against the aforesaid bias and on the other arm thereof there are formed bent piece 54a for engaging with restraining step 53 of driving ring 52 for opening the shutter and bent piece 54b for engaging with restraining arm 55b of driving ring 55 for closing the shutter.

In the state where the shutter cocking is finished as shown in FIG. 11, both connection projections 55a and 52a engage with each other and restraining step 53 engages with bent piece 54a beyond it, and in the state where springs 57 and 58 are energized blade 51 is held in its closing position.

In this state, upon depressing the shutter button in the circuit shown in FIG. 7 power switch S''' is closed to cause an exciting current to flow to electromagnet $M_a'''$ and tend to turn restraining lever 54 clockwise. However, at this juncture the armature is separated from electromagnet $M_a'''$, spring 56 is acting on the restraining lever, and on restraining step 53 the accumulated energy of spring 57 is acting at right angles to the direction to which the bent piece is going to move, so that on account of the large frictional force thereof the attraction force is required to be considerably large. As a result, as shown in FIG. 7, by connecting feed terminal J to power source E''' it is necessary to increase the exciting current.

By virtue of the attraction restraining lever 54 is turned clockwise against spring 56 and restraining step 53 is disengaged from bent piece 54a. Accordingly, driving ring 52 for opening the shutter is actuated to turn clockwise. And simultaneously, well known timing switch $S_1'''$ [not shown in FIG. 11] is opened and the delay circuit becomes operative.

Further, driving ring 55 for closing the shutter also follows after driving ring 52 for opening the shutter to tend to turn clockwise. However, restraining arm 55b thereof engages with bent piece 54b of restraining lever 54 the clockwise turning of which is finished and the turning of driving ring 55 is checked so that blade 51 is opened.

When the charging voltage to capacitor $C_s'''$ gets to the predetermined voltage all of transistors $Tr_{17}$, $Tr_{19}$, $Tr_{20}$, and $Tr_{18}$ are reversed, the exciting current to electromagnet $M_g'''$ is cut off, restraining lever 54 is turned counter-clockwise by spring 56, and restraining arm 55b is disengaged from bent piece 54b, so that driving ring 55 for closing the shutter follows after driving ring 52 for opening the shutter the predetermined turning of which is finished by spring 58 and continues to turn until connection projection 52a engages with connection projection 55a. Thereby, shutter blade 51 is again rotated to the closing position.

Also in this case, since the counterclockwise turning of restraining lever 54 effected by spring 56 also is carried out against the frictional force between restraining projection 55b and bent piece 54b, the accumulated energy of spring 56 also is required to be strong, therefore, the attraction force of electromagnet $M_g'''$ is required to be larger.

Figure 8:
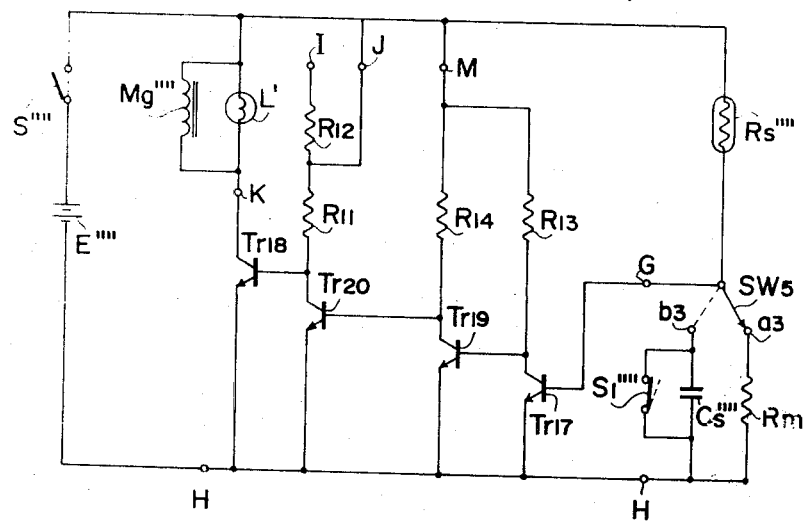
FIG. 8 is a diagram in which the switching circuit is used for another shutter control.

The embodiment shown in FIG. 8, is adapted to provide an indication and alarm in its external circuit that the brightness of an object is or is not proper for EE photographing, and in the integrated circuit device composed of the same circuit formation as in the embodiment described hereinbefore feed terminal J is connected to power source $E''''$ so as to provide a strong exciting current.

In this embodiment, capacitor $C_s''''$ and resistance $R_m$ are respectively connected in series to photoconductive element $R_s''''$ through change-over switch $Sw_5$.

Upon depressing the shutter button, first of all power switch $S''''$ is connected, and by means of change-over switch $Sw_5$ located on contact $a_3$ the resistance value of photoconductive element $R_s''''$ in accordance with the brightness of an object and the set value are compared with each other. Thus, when the resistance value of photoconductive element $R_s''''$ is higher (when the object is dark) output transistor $Tr_{18}$ is conductive and an exciting current flows to electromagnet $M_g''''$ and simultaneously lamp L' is lit to indicate that EE photographing is not proper.

When the resistance value of photoconductive element $R_s''''$ is lower (when the object is light) lamp L' is not lit and by depressing further the shutter button change-over switch $Sw_5$ is changed over from contact $a_3$ to contact $b_3$ and to electromagnet $M_g''''$ an exciting current flows to electromagnet $M_g''''$, and the subsequent operations are effected in the same manner as in the embodiment described above.

In every embodiment described above, the feed terminal is composed of two terminals I including resistance $R_{12}$ and terminal J for short-circuiting it, however, it is possible to provide additionally a feed terminal between them.

By the construction as described above, when a single feed terminal is provided as seen in the circuit shown in FIG. 1, for example, when an exciting current of 20mA flows to electromagnets $M_g''$ and $M_g''''$ and the exciting current to electromagnet $M_g''$ is 10mA which is sufficient to operate the shutter, 10mA is a useless current consumption, and when only 10mA flows to electromagnets $M_g'''$ and $M_g''''$ it is impossible to operate the shutter. In FIG. 1, provided that the current amplification of transistor $Tr_{14}$ or $Tr_{15}$, or transistor $Tr_{10}$ is $h_{FE}$, the collector current thereof is I, and the base resistance corresponding thereto is $R_x$, the following formula is set up:

$$I = h_{FE} E / R_x$$

wherein, as shown in FIGS. from 6 to 8, by substituting resistance $R_x$ for the resistance value of $(R_{11} + R_{12})$ or $R_{11}$ it is possible to select collector current I for various conditions.

What we claim is:

1. A universal circuit module adaptable for automatic exposure control of different types of camera shutter mechanisms, comprising:
   a pair of common terminals for connection to a power source;
   first switching means connected to said common terminals and comprising:
   first and second input terminals and a first output terminal adapted to receive a load, means for generating a signal in response to an input signal between said first and second input terminals, and means responsive to said signal for supplying electrical energy to said first output terminal with said load connected thereto; said circuit module further comprising:
   second switching means comprising:
   semiconductor switch means having a third input terminal adapted to at least be connected to said first ouput terminal, and a second output terminal adapted to receive a second load, said semiconductor switch means providing electrical energy to said second output terminal with said second load connected thereto;
   a third output terminal;
   means for supplying electrical energy to said third output terminal adapted to receive a third load and adapted to be responsive to the actuation of said semiconductor switch means; and said circuit module further comprising;
   biasing means connected to said common terminals for biasing said semiconductor switch means whereby said semiconductor switch means may be actuated when the voltage at said third input terminal is one-half of the voltage of said power source.

2. A universal automatic exposure control circuit as in claim 1, wherein said voltage biasing means further includes two serially connected diodes and two serially connected resistors connected in series to said two diodes, said two diodes and resistors are connected across said common terminals and said semiconductor switch means further includes an input transistor having a base as said third input terminal and an emitter connected between said two resistor means, said two resistors have equal resistances, and each of said two diodes has electric and temperature characteristics such that the voltage across each of said two diodes is equal to the base-emitter voltage of said input transistor.

3. A universal exposure control circuit as in claim 1 wherein the structure thereof is an integrated circuit.

4. A universal circuit module as in claim 1, wherein said means for supplying electrical energy to a third output terminal further includes an output transistor having a fourth output terminal and a fourth input terminal, said fourth output terminal is adapted to receive a fourth load and said fourth input terminal is adapted to be at least connected to said third output terminal.

5. A universal circuit module as in claim 4, wherein said second switching means further includes a number of selectable terminals respectively connected to a control electrode of said means for supplying electric energy through said third output terminal, said selectable terminals being connected to said control electrode through resistors respectively having different resistances so that said electric energy from said second switching circuit varies in accordance with the selection of one of said number of terminals.

6. A universal circuit module as in claim 5 wherein the structure thereof is an integrated circuit.

7. A universal circuit module as in claim 1, wherein said second switching circuit further includes a number of selectable terminals respectively connected to a control electrode of said means for supplying electric energy through said third output terminal, said selectable terminals being connected to said control electrode through resistors respectively having different resistances so that said electric energy from said second switching circuit varies in accordance with the selection of one of said number of terminals.

8. A universal circuit module as in claim 1, wherein said second switching means further includes a number of selectable terminals respectively connected to a control electrode of said means for supplying electric energy through said third output terminal, said selectable terminals being connected to said control electrode through resistors respectively having different resistances so that said electric energy from said second switching circuit varies in accordance with the selection of one of said number of terminals.

9. A universal exposure control circuit as in claim 8 wherein the structure thereof is an integrated circuit.

* * * * *